United States Patent [19]

Breitweg

[11] Patent Number: 4,621,703

[45] Date of Patent: Nov. 11, 1986

[54] HYDRAULIC AUXILIARY POWER STEERING, ESPECIALLY FOR MOTOR VEHICLES

[75] Inventor: Werner Breitweg, Schwäbisch Gmünd, Fed. Rep. of Germany

[73] Assignee: Zahnradfabrik Friedrichshafen, AG., Friedrichshafen, Fed. Rep. of Germany

[21] Appl. No.: 760,737

[22] PCT Filed: Nov. 14, 1984

[86] PCT No.: PCT/EP84/00360
§ 371 Date: Jul. 24, 1985
§ 102(e) Date: Jul. 24, 1985

[87] PCT Pub. No.: WO85/02380
PCT Pub. Date: Jun. 6, 1985

[51] Int. Cl.[4] .............................................. B62D 5/08
[52] U.S. Cl. ................................. 180/143; 91/375 A; 91/434
[58] Field of Search ............. 180/132, 133, 140, 141, 180/143; 91/434, 375 R, 375 A, 380

[56] References Cited

U.S. PATENT DOCUMENTS

| | | | |
|---|---|---|---|
| 4,154,317 | 5/1979 | Nishikawa et al. | 180/143 |
| 4,373,598 | 2/1983 | Elser | 91/434 X |
| 4,421,010 | 12/1983 | Elser | 91/375 R |

*Primary Examiner*—John J. Love
*Assistant Examiner*—Charles R. Watts
*Attorney, Agent, or Firm*—Zalkind & Shuster

[57] ABSTRACT

Simulated steering resistance is provided for the rotative valving control of a booster steering servomotor by providing the manually rotated section of the valving control which connects to a steering wheel with a coaxial reaction piston having faces exposed to operating pressures of the respective chambers of a double ended servomotor. The reaction piston is helically geared on the manually rotated section and restrained by a sliding keyway against rotation relative the valving control section conventionally connected by a torque rod to the manually rotated section. During steering, operating pressure on one face or the other of the reaction piston will cause it to shift and thereby effect a torque force on the manually rotated section due to the helical gearing which force opposes the manual steering force to thus simulate steering resistance.

9 Claims, 7 Drawing Figures

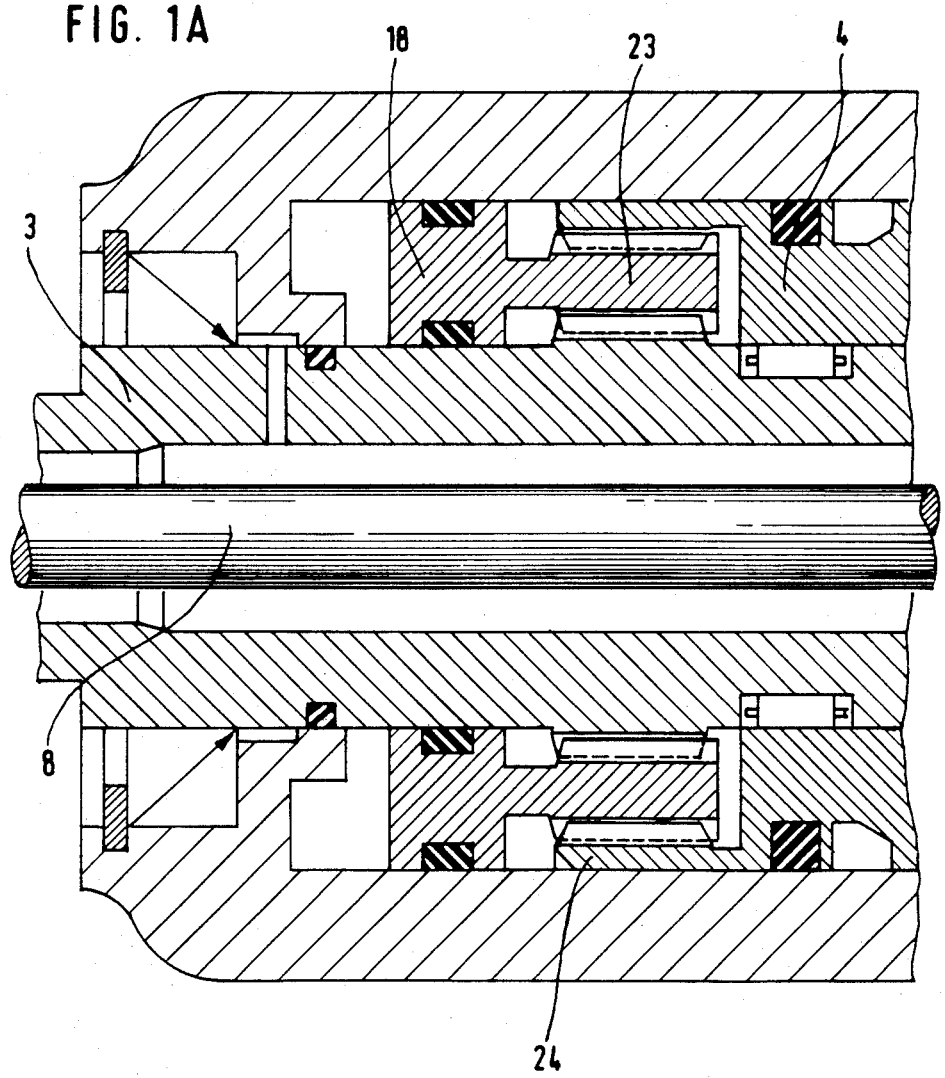

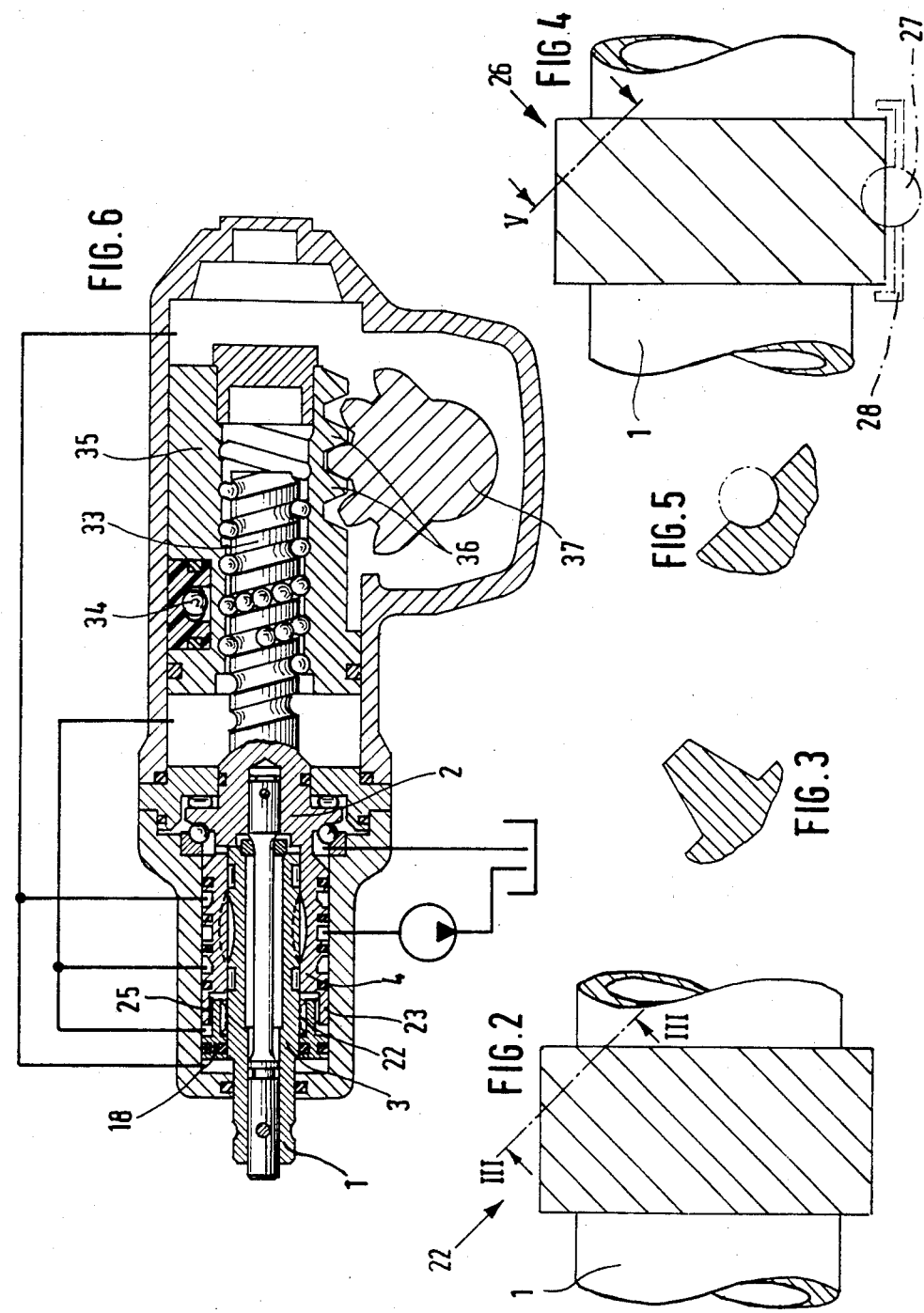

HYDRAULIC AUXILIARY POWER STEERING, ESPECIALLY FOR MOTOR VEHICLES

BACKGROUND OF THE INVENTION

German Pat. OS No. 24 34 604, having a counterpart in U.S. Pat. No. 3,998,131 shows a two section steering spindle connected by a torque rod. One section carries a steering wheel and the second section connects to a rack and pinion for actuating a steering linkage. The two sections coact as a rotary control valve in a well known manner, having relative rotation for valving control.

Intermediate the sections ball bearings are carried in radial bores in one section and rest in V-notches on the other. The outer sides of the ball bearings are exposed to servomotor pressure. The greater the pressure and the greater the relative rotation, the greater the detent effect of the ball bearings in the notches. This simulates steering resistance.

There is a disadvantage in that the slightest imperfection in machining the notches prevents the ball bearings from maintaining simultaneous contact with the notches in neutral steering position, causing a difference in simulated steering resistance for one steering direction as compared with the other. Further, the ball bearings have too short a sealing length against the pressure on their outer sides so that under low operating pressure conditions, sensitivity of reaction to simulate steering resistance suffers accordingly.

BRIEF DESCRIPTION OF THE PRESENT INVENTION

A pair of coaxial spindle sections are utilized having relative movement in a housing wherein a first section is to be rotated by a steering spindle and is connected to a second section by a torque rod. The second section is to be connected by a rack and pinion to the steering linkage of a vehicle.

The sections are provided with coacting valving passages to control pressure flow and exhaust, coacting with valve housing passages.

Upon rotation of the first section by a steering wheel the road resistance met by the second section causes relative movement between the two sections against the opposing torque force of the torque rod which serves to return the sections to a neutral straight ahead steering relationship after the end of a steering operation.

The relative movement of the sections effects valving functions to control pressure flow to and exhaust of the servomotor, all in a well known manner.

Mounted coaxially and slidably on the first section is a reaction piston which is reciprocal within the housing wherein the construction effects a reaction pressure chamber for respective faces of the piston. The reaction pressure chambers communicate with valving passages of the spindle sections so that either reaction chamber receives working pressure of the servomotor while the other has exhaust pressure, coinciding with these pressures in the servomotor pressure chambers.

The reaction piston has a helical gearing connection with the first spindle section and connnects via a slidable keyway with the second section. Accordingly, when the reaction piston is pressurized on one surface it is restrained against rotation but can reciprocate due to the pressurization. As a result, the helical gearing connection exerts a reactive torque force on the first section which opposes the manual steering force exerted thereon to effect simulated steering resistance.

The invention permits a construction which is precise in coaction of the relatively movable reactive components.

A detailed description of the invention now follows in conjunction with the appended drawing in which:

FIG. 1A is an enlarged fragmentary section of FIG. 1;

FIG. 2 is an enlarged plan view of the helical gearing on the first spindle sction;

FIG. 3 is a section on the line III—III of FIG. 2;

FIG. 4 is a variation wherein ball bearings are utilized in a cage which encompasses helical gearing on the first spindle section in place of helical teeth on the second spindle sction;

FIG. 5 is a section on the line V—V of FIG. 4;

FIG. 6 shows a modified drive utilizing a ball nut between a second steering spindle and a rack for rotation of a steering pinion segment.

Figure 1:
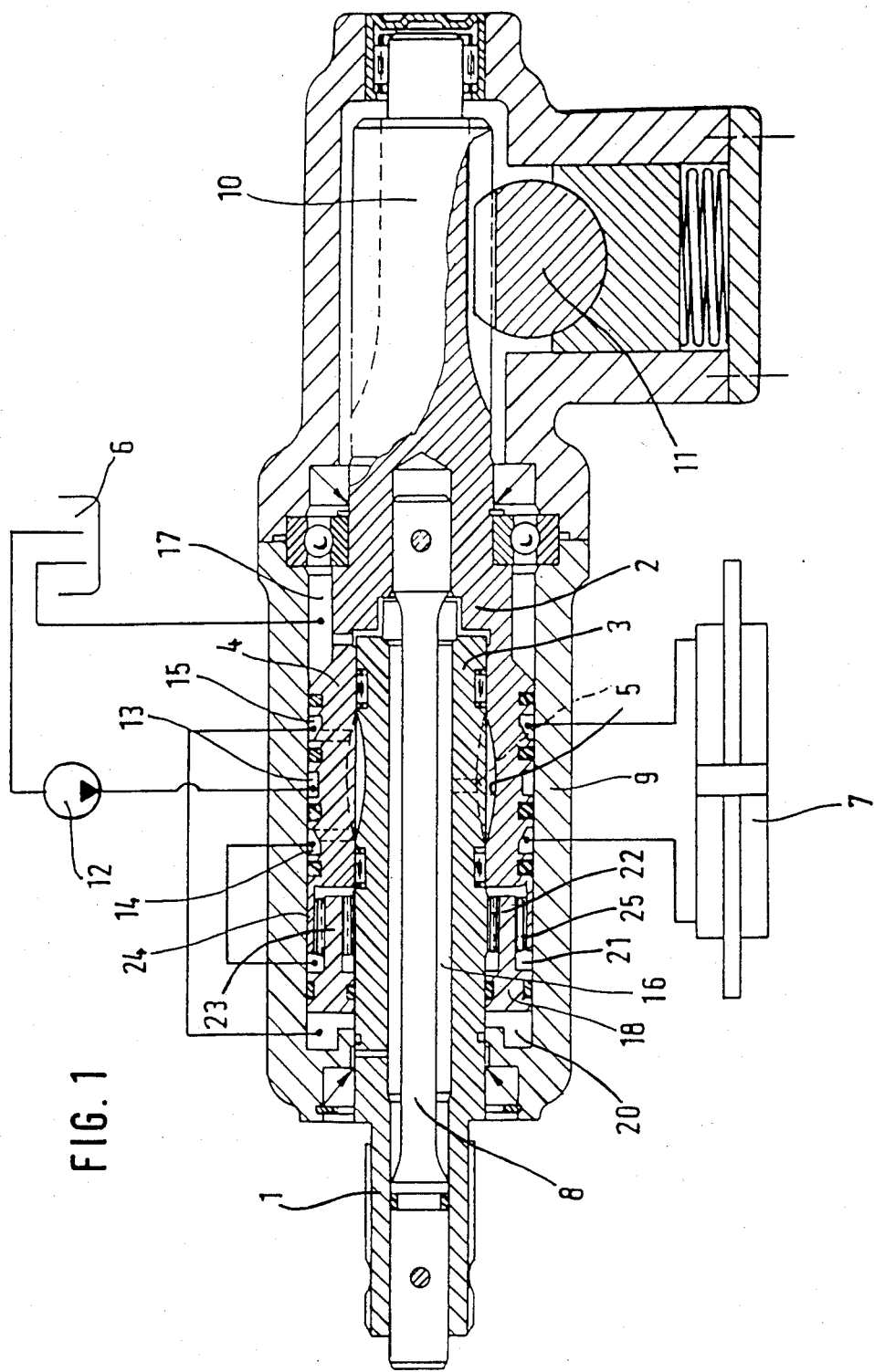
FIG. 1 is a longitudinal section through one embodiment.

Referring now to the drawing, FIG. 1 shows a steering spindle comprised of a spindle section 1 having an inner valve sleeve 3 and a spindle section 2 having an outer valve sleeve 4. The inner valve sleeve 3 and outer valve sleeve coact in a known manner, having the usual passages such as grooves and channels for pressurizing the pressure chambers of a servomotor 7 with exhaust return to a tank 6.

It will be understood that a manually operated wheel is secured to section 1. The sections are connected to each other by a torque rod 8.

Spindle section 2, beyond outer valve sleeve 4, has a pinion 10 machined thereon, engaging a rack 11. Oil from pump 12 feeds to annular groove 13 for flow to an axial groove array 5 from whence it flows to annular groove 14 or 15 to servomotor 7, depending on direction of steering rotation. Return flow is via a bore 16 through which the torque rod 8 passes, the bore being within section 1, as shown, whence flow passes via the annular chamber 17 to tank 6.

A reaction piston 18 is disposed in valve housing 9, the construction being such that reaction chambers 20 and 21 are effected for respective faces of the reaction piston. Reaction chamber 20 communicates with annular groove 15 in turn communicating with the right side pressure chamber of servomotor 7; reaction chamber 21 communicates with annular groove 14 in turn communicating with the left side pressure chamber.

Reaction piston 18 has a collar 23. A helical gearing 22 is intermediate the collar and spindle section 1, on which the collar is slidable. Also, a sliding keyway 25 is between collar 23 and an extended end collar 24 of spindle section 2.

The sliding keyway consists of one or more straight meshed teeth and prevents relative rotation between collar 23 and spindle section 2.

In operation, depending on direction of steering rotation of the steering spindle sections, groove 14 or 15 will receive pressure flow by valving coaction of inner valve sleeve 3 with outer valve sleeve 4, from pump 12, for pressurizing one pressure chamber or the other of servomotor 7, all as well understood.

However, such pressure will also feed to reaction chamber 21 or 20 against a respective opposed surface of reaction piston 18. This results in a rotative reaction torque force being exerted through the helical gearing 22 on spindle sction 1 which simulates steering resistance in the hands of the vehicle operator.

The sliding keyway 25, as explained above, prevents reaction piston 18 from rotating relative to spindle section 2 so that the reciprocation of the reaction piston, in a sense, drives spindle section 1 in a rotative direction which opposes the steering direction rotation.

In general, the magnitude of the reaction torque force on spindle section 1 depends on the radial surfaces of the reaction piston 18 as well as on the helical angle of gearing 22. Accordingly, for a given surface of reaction piston 18, a small helical angle of rise produces a small torque force, a large angle producing a large torque force. As a practical matter in the present invention, as shown in FIG. 2, a helical angle of 45° suffices. However, under parking conditions, in order to avoid too strong a reaction torque force against which the vehicle operator must work, it can be of advantage to limit the pressures in the reaction pressure chambers by the use of relief valves.

FIGS. 4 and 5 show a variation where instead of helical teeth on the spindle sctions, a helical gearing 26 having ball bearings 27 may be used to decrease friction. The ball bearings 27 are carried in a ball bearing cage 28, which can be expanded and mounted over helical gearing 26. The sliding keyway may likewise utilize ball bearings (not shown).

FIG. 6 is of the same reaction component, etc., construction as FIG. 1. Thus, the inner valve sleeve 3 and outer valve sleeve 4 and the reaction components 18, 22, 25 are as in FIG. 1. The difference is only in the drive for the steering linkage in that spindle section 2 is extended and machined as a ball worm which in coaction with a ball chain 34 drives a steering nut 35 having a rack 36 which drives a pinion segment 37 for operating a steering linkage.

I claim:

1. In a power steering control device of the kind having a housing (9) with a steering spindle having a first section (1) and a second section (2), said sections being relatively rotative and connected by a torque rod (8) wherein the first section is for connection to a manually operated steering wheel to receive steering force and the second section is for mechanical connection to vehicle wheels, said sections having a coacting inner (3) and outer (4) valve sleeves for operation of a servomotor (7) having pressure chambers connecting to respective passages (14, 15) of said outer sleeve to be pressurized responsive to relative rotation of said steering spindle sections, including a steering reaction means responsive to operating pressure in said pressure chambers for simulating steering resistance;

the improvement wherein:
the steering reaction means comprises a reaction piston (18) carried coaxially on said first spindle section (1) and reaction chambers (20, 21) in said housing with the faces of said reaction piston exposed in respective reaction chambers;

means whereby either reaction chamber receives pressure during operation of said servomotor so as to shift said reaction piston;

helical gearing (22) intermediate said reaction piston and said first section of said steering spindle;

a sliding keyway (25) intermediate said reaction piston and said second section (2) of said steering spindle to prevent relative rotation therebetween;

whereby pressure acting on either face of said reaction piston is operative to shift said piston and thereby effect a rotative torque force on said first section of said steering spindle through said helical gearing to oppose steering force on said first section, simulating steering resistance.

2. In a power steering control device as set forth in claim 1, said second section having an end collar (24) and said sliding keyway being disposed in said collar.

3. In a power steering control device as set forth in claim 1, wherein said helical gearing comprises a collar (23) on said reaction piston with internal helical teeth in said collar and also comprises said first section of said steering spindle having helical teeth meshing with said internal helical teeth of said collar.

4. In a power steering control device as set forth in claim 1, wherein the passages (14, 15) of said outer valve sleeve (4) connect to respective reaction chambers (21, 23).

5. In a power steering control device as set forth in claim 1, said outer valve sleeve (4) having a radial end face and one (20) of said reaction chambers comprising said end face opposite a respective face of said reaction piston (18); said housing having a radial wall and the other (21) of said reaction chambers comprising said radial wall opposing a respective face of said reaction piston.

6. In a power steering control device as set forth in claim 5, said reaction piston having a collar (23) extending toward the radial end face of said outer valve sleeve (4); said helical gearing (22) comprising internal helical teeth of said collar and coacting external helical teeth of said first section (1) of said steering spindle.

7. In a power steering control device as set forth in claim 6, including a sliding keyway (25) intermediate said collar and said outer valve sleeve (4) to prevent relative rotation of said reaction piston and said outer valve sleeve.

8. In a power steering control device as set forth in claim 1, including ball bearings (27) in said helical gearing and in said sliding keyway to reduce friction.

9. In a power steering control device as set forth in claim 1,
said second section having an end collar (24) and said reaction piston (18) having a collar (23) encompassing said end collar, said sliding keyway being disposed intermediate said collars.

* * * * *